(No Model.)

W. RUMBLE.
HEATING AND PUDDLING FURNACE.

No. 248,059. Patented Oct. 11, 1881.

WITNESSES.
Geo. K. Storm
S. Masfari

Washington Rumble INVENTOR.
By
Howard Bros, his ATTORNEYS.

UNITED STATES PATENT OFFICE.

WASHINGTON RUMBLE, OF WHEELING, WEST VIRGINIA.

HEATING AND PUDDLING FURNACE.

SPECIFICATION forming part of Letters Patent No. 248,059, dated October 11, 1881.

Application filed May 20, 1881. (No model.)

*To all whom it may concern:*

Be it known that I, WASHINGTON RUMBLE, a resident of the city of Wheeling, in the county of Ohio and State of West Virginia, have invented certain new and useful Improvements in Heating and Puddling Furnaces; and I do hereby declare that the following is a full, clear, and exact description of the invention, which will enable others skilled in the art to which it appertains to make and use the same, reference being had to the accompanying drawings, and to letters of reference marked thereon, which form a part of this specification.

My invention relates to that class of heating and puddling furnaces in which heated air is combined with the products of combustion for the purpose of igniting the unconsumed gases, and thereby increasing the heat of the furnace; and to that end the invention consists in an improved construction and arrangement of air-heating flues and passages in the crown and walls of the furnace, whereby the waste heat of the walls is utilized to furnish a supply of fresh hot air to aid in the combustion of unconsumed gases arising from the combustion-chamber.

Figure 1:
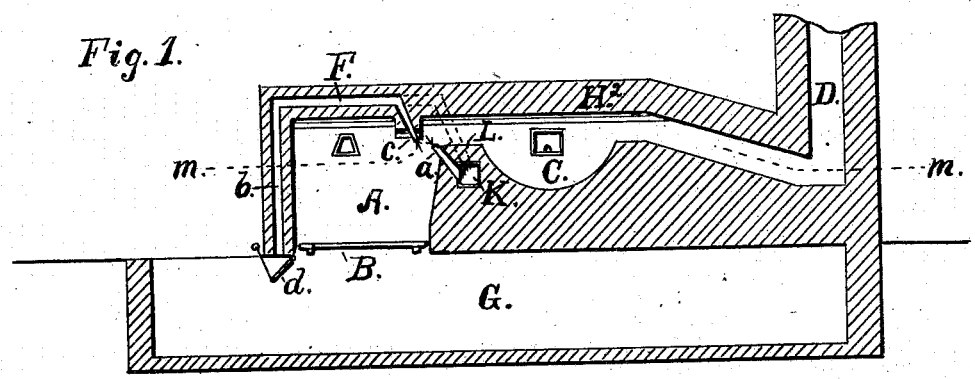
Figure 2:
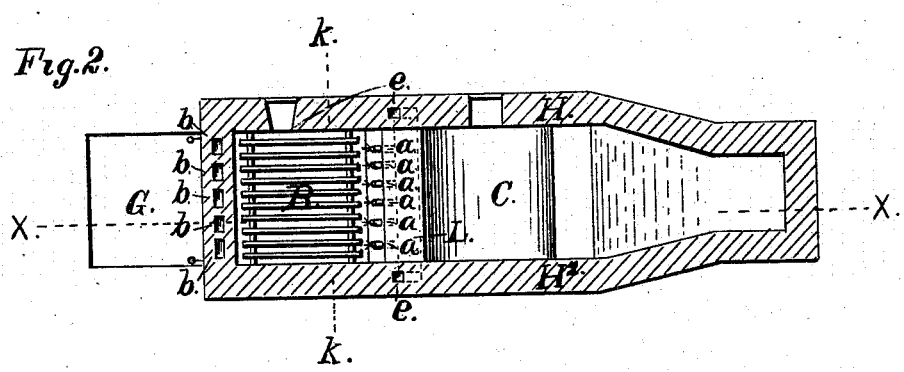
Figure 3:
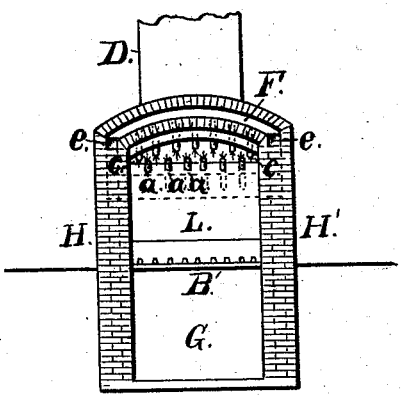

In the drawings, Figure 1 is a vertical lengthwise section on line $x$ $x$ of Fig. 2, which is a horizontal section on line $m$ $m$ of Fig. 1; Fig. 3, cross-section, $k$ $k$, of Fig. 2.

Like letters of reference refer to like parts.

The letters H H' designate the opposite walls of the furnace; H², the roof or crown; A, the combustion-chamber; B, the grate; L, the bridge-wall; C, the melting and puddling apartment; D, the smoke-stack; G, the ash-pit.

The walls of the furnace are built preferably of ordinary clay brick, fire-clay brick being used for the lining of the heating and melting part of the furnace. The outside wall of the combustion-chamber is built with a series of vertical flues, $b$, which open into and extend from the ash-pit upward and connect with an air-chamber, F, in the crown of the furnace. The bottom of these flues is provided with a damper, $d$, or an equivalent shut-off device, to regulate the admission of cold air.

K is a flue or air-passage in the bridge-wall, extending across the furnace to the side walls. $e$ $e$ are flues in the side walls, extending from the air-chamber F in the crown of the furnace and connecting with the air-flue K in the bridge-wall.

$c$ and $a$ are passages in the crown of the furnace and bridge-wall, respectively, for the admission of heated air to the combustion-chamber. These air-passages into the combustion-chamber are inclined toward each other and proportioned to suit the exigencies of the case, and placed preferably near the throat of the furnace, as shown in Fig. 1, in order that the heated air may thoroughly commingle with the smoke and gases and increase the draft, promoting thorough combustion before their passage into the melting-apartment. When the furnace-fires are lighted the walls of the combustion-chamber and the arched crown of the same are the parts that first receive the heat, and when the fire becomes sufficiently hot the damper is opened and the cold air admitted gradually in requisite quantities. When the furnace is in full operation the walls and crown of the combustion-chamber, including the bridge-wall, are constantly at a high red heat, and the atmospheric air, in being drawn through the flues by the draft of the furnace, is raised to a high degree of heat before it enters into the hot gases at the crown of the combustion-chamber, where it unites in combustion with them, serving in a great measure to consume the smoke before its passage into the heating and melting apartment, thus decreasing the liability of injurious effects of the unconsumed smoke and gases upon the metal in treatment.

By connecting the hollow bridge-wall with the air-chamber I am enabled to control the inflow of air with one damper or regulating device, and I also obtain a division of the inflow to the combustion-chamber on opposite sides of the throat of the furnace, whereby the air can readily combine in free combustion with the gases in the furnace.

The advantages of hollow walls to prevent the rapid burning out and destruction of the same are obvious and need not be specially referred to.

Having described my invention, what I claim, and desire to secure by Letters Patent of the United States, is—

In a puddling-furnace, the combination of the air-chamber F in the crown of the furnace, the vertical flue $bb$ for supplying air thereto, the bridge-wall, having the flue K, communicating with the air-chamber F by flues $ee$, and the air-passages $ca$, inclined toward each other and adapted to discharge near the throat of the furnace.

In testimony that I claim the foregoing as my own I hereunto affix my signature in presence of two witnesses.

WASHINGTON RUMBLE.

Witnesses:
 GEO. K. STORM,
 S. MASSARI.